(12) United States Patent
Ginestra et al.

(10) Patent No.: US 11,344,865 B2
(45) Date of Patent: May 31, 2022

(54) PROCESS FOR THE CATALYTIC CONVERSION OF MICRO CARBON RESIDUE CONTENT OF HEAVY HYDROCARBON FEEDSTOCKS AND A LOW SURFACE AREA CATALYST COMPOSITION FOR USE THEREIN

(71) Applicant: SHELL OIL COMPANY, Houston, TX (US)

(72) Inventors: Josiane Marie-Rose Ginestra, Richmond, TX (US); David Edward Sherwood, Spring, TX (US); David Andrew Komar, Winfield, PA (US)

(73) Assignee: SHELL USA, Inc., Houston, TX (US)

( * ) Notice: Subject to any disclaimer, the term of this patent is extended or adjusted under 35 U.S.C. 154(b) by 387 days.

(21) Appl. No.: 16/663,744

(22) Filed: Oct. 25, 2019

(65) Prior Publication Data

US 2020/0055033 A1  Feb. 20, 2020

Related U.S. Application Data

(62) Division of application No. 14/548,439, filed on Nov. 20, 2014, now Pat. No. 10,507,459.

(60) Provisional application No. 61/908,334, filed on Nov. 25, 2013.

(51) Int. Cl.
| | |
|---|---|
| *B01J 27/19* | (2006.01) |
| *B01J 35/10* | (2006.01) |
| *C10G 45/08* | (2006.01) |
| *C10G 47/04* | (2006.01) |
| *C10G 45/60* | (2006.01) |
| *B01J 37/00* | (2006.01) |
| *C10G 65/00* | (2006.01) |

(52) U.S. Cl.
CPC .............. *B01J 27/19* (2013.01); *B01J 35/108* (2013.01); *B01J 35/1019* (2013.01); *B01J 35/1061* (2013.01); *B01J 37/0009* (2013.01); *C10G 45/08* (2013.01); *C10G 45/60* (2013.01); *C10G 47/04* (2013.01); *C10G 65/00* (2013.01)

(58) Field of Classification Search
None
See application file for complete search history.

(56) References Cited

U.S. PATENT DOCUMENTS

| | | |
|---|---|---|
| 5,468,371 A | 11/1995 | Nelson et al. |
| 5,498,586 A | 3/1996 | Dai et al. |
| 5,616,530 A | 4/1997 | Sherwood, Jr. |

(Continued)

FOREIGN PATENT DOCUMENTS

| | | |
|---|---|---|
| CN | 1940029 A | 4/2007 |
| WO | 9604073 A1 | 2/1996 |
| WO | 2004052534 A1 | 6/2004 |

OTHER PUBLICATIONS

International Search Report and Written Opinion received for PCT Patent Application No. PCT/US2014/066493, dated Feb. 18, 2015, 09 pages.

*Primary Examiner* — Colin W. Slifka
(74) *Attorney, Agent, or Firm* — Shell USA, Inc.

(57) ABSTRACT

An improved process for the hydroconversion of micro carbon residue content of heavy hydrocarbon feedstocks by the use of a catalyst composition that is especially useful in the conversion of micro carbon residue of such feedstocks. The catalyst composition is a low surface area composition that further has a specifically define pore structure the combination of which provides for its enhance micro carbon residue conversion property.

15 Claims, 2 Drawing Sheets

(56) References Cited

U.S. PATENT DOCUMENTS

| | | |
|---|---|---|
| 5,827,421 A | 10/1998 | Sherwood, Jr. |
| 5,928,499 A | 7/1999 | Sherwood, Jr. |
| 5,968,348 A | 10/1999 | Sherwood, Jr. |
| 7,491,313 B2 | 2/2009 | Toshima et al. |
| 7,790,652 B2 | 9/2010 | Ackerman et al. |
| 7,871,513 B1 | 1/2011 | Bhan |
| 9,039,891 B2 | 5/2015 | Ginestra et al. |
| 2002/0000397 A1 | 1/2002 | Sherwood, Jr. |
| 2010/0243526 A1 | 9/2010 | Ginestra et al. |

PROCESS FOR THE CATALYTIC CONVERSION OF MICRO CARBON RESIDUE CONTENT OF HEAVY HYDROCARBON FEEDSTOCKS AND A LOW SURFACE AREA CATALYST COMPOSITION FOR USE THEREIN

This application is a divisional of U.S. Non-Provisional application Ser. No. 14,548,439, filed Nov. 20, 2014, now U.S. Pat. No. 10,507,459, which claims the benefit of U.S. Provisional No. 61/908,334, filed Nov. 25, 2013, the disclosures of which are incorporated herein by reference.

The invention relates to a process for the catalytic conversion of micro carbon residue ("MCR") content of heavy hydrocarbon feedstocks and a low surface area composition useful as a catalyst for the catalytic conversion MCR content of heavy hydrocarbon feedstocks.

There is an ongoing effort to find improved catalyst compositions that may suitably be used in hydroprocessing of heavy hydrocarbon feedstocks. A desirable property of these catalyst compositions in addition to having high stability in catalytic activity when used in the hydroprocessing of heavy hydrocarbon feedstocks is providing for a high level of conversion of MCR contained in the heavy hydrocarbon feedstocks. Disclosed in U.S. Pat. No. 5,616,530 (Sherwood, Jr. et al.) is an impregnated, alumina supported catalyst composition for use in the hydroprocessing of a heavy hydrocarbon feedstock. The catalyst includes an alumina support that is impregnated with a Group VIII metal (e.g., nickel) and a Group VIB metal (e.g., molybdenum) and has a specified pore size distribution. The pore size distribution of the catalyst is such that from 50% to 62.8% of the total pore volume is present in the micropores of diameter from 55 to 115 Å and from 20% to 30.5% of the total pore volume is present in the macropores of diameter greater than about 250 Å. Present in the large macropores of diameter from 500 to 10,000 Å is from about 18 to 24% of the total pore volume. The metal loadings of the catalyst include a non-cobalt Group VIII metal oxide in an amount of from 2.5 to 6 wt. % and a Group VIB metal oxide in an amount of from 14.5 to 24 wt. %.

Disclosed in U.S. Pat. No. 5,498,586 (Dai and Sherwood, Jr.) is a catalyst composition consisting essentially of a porous alumina support bearing 3 to 6 wt. % of a Group VIII metal oxide, 14.5 to 24 wt. % of a Group VI-B, and 0 to 6 wt. % of a phosphorus oxide for use in the hydroprocessing of a heavy hydrocarbon feedstock. The catalyst has a total pore volume of 0.5 to 0.75 cubic centimeters per gram (cc/g) and a specified pore size distribution. The pore size distribution of the catalyst is such that from 63% to 78% of the total pore volume is present in the micropores of diameter from 55 to 115 Å, from 0.12 cc/g to 0.16 cc/g of the total pore volume is present in large pores of a diameter greater than 160 Å and from 11% to 18% of the total pore volume is present in the macropores of diameter greater than about 250 Å. The total surface area of the catalyst is 240 square meters per gram ($m^2/g$) to 310 $m^2/g$.

U.S. Pat. No. 6,387,248 (Sherwood, Jr. et al.) discloses a relatively low surface area catalyst composition having a specific pore size distribution and is made by co-mulling alumina, Group VIII metal salt and Group VIB metal salt and forming an extrudate of the mixture that is subjected to a relatively low temperature hydrothermal calcination.

The hydrothermal calcination is conducted in an atmosphere of air and steam and at a temperature of from about 1000° F. to 1150° F. The catalyst contains from about 1.1 to about 6 wt nickel oxide and from about 5 to about 24 wt % molybdenum oxide. The pore size distribution of the catalyst is such that less than about 20% of the total pore volume is as micropores of diameter less than about 100 Å, at least about 34% of the total pore volume is as micropores of diameter in the range of from about 100 Å to 200 Å, and from about 26% to 46% of the total pore volume is present as mesopores of diameter greater than or equal to 200 Å. The catalyst has a total surface area of from 150 to 240 $m^2/g$.

U.S. Pat. No. 8,372,268 (Ginestra, et al.) discloses reasonably high surface area composition useful in the conversion of micro carbon residue and having a specific pore distribution and metals loading. The composition is made by co-mulling alumina powder, a nickel compound, a molybdenum compound with water or acid to provide a co-mulled mixture that is agglomerated and calcined. The catalyst composition has a relatively high total surface area that is in the range of from 240 $m^2/g$ to 360 $m^2/g$, as determined by the nitrogen BET method. The pore structure of the catalyst is such that from 50% to 80% of its total pore volume is present in pores having a diameter in the range of from 55 Å to 115 Å and from 11% to 30.5% of the total pore volume is present in pores having a diameter greater than or equal to 250 Å.

U.S. Pat. No. 8,372,268 is incorporated herein by reference.

It is desirable for certain hydroprocessing processes and catalysts to provide for the high conversion of the coke precursors of heavy hydrocarbon feedstocks, which are typically referred to as "Micro Carbon Residue," or MCR, in order to prevent or reduce fouling of downstream process equipment and to provide other benefits.

An inventive catalyst has been discovered that provides for significantly improved MCR conversion over similar prior art catalysts when used in processes for the hydroprocessing of heavy hydrocarbon feedstocks for the purpose of converting or reducing the MCR content. With the use of the inventive catalyst in these processes, significant improvements in the MCR conversion can be achieved.

Accordingly, the inventive composition is a catalyst that has especially useful properties in the hydroconversion of heavy hydrocarbon feedstocks containing significant amounts of micro carbon residue. This catalyst composition comprises a calcined particulate of a co-mulled mixture, wherein said co-mulled mixture comprises a molybdenum component, a nickel component, pseudo-boehmite powder, and a mineral acid, and wherein said calcined particulate is prepared under conditions so that it has specifically defined physical properties including: (a) a total surface area of greater than 160 $m^2/g$ and less than 240 $m^2/g$; (b) a median pore diameter in the range of from 85 Å to 120 Å; (c) from 5% to 30% of the total pore volume of said calcined particulate in the macropores having a pore diameter of 250 Å or greater; and (d) no more than 60% of the total pore volume of said calcined particulate within its pores having a diameter in the range of from 55 Å to 115 Å.

The catalyst composition of the invention can be used in a process for the hydroconversion of a heavy hydrocarbon feedstock, wherein said process comprises: contacting, under suitable hydroconversion conditions, such as ebullated bed resid conversion conditions, said heavy hydrocarbon feedstock with the catalyst composition.

Another aspect of the invention includes a process for converting at least a portion of an MCR content of a heavy hydrocarbon feedstock to yield a product having a reduced MCR content, wherein said process includes contacting said heavy hydrocarbon feedstock with a catalyst under MCR conversion process conditions and yielding said product, wherein the improvement comprises: enhancing the conversion of said MCR content of said heavy hydrocarbon feedstock by using as said catalyst in said process a calcined particulate of a co-mulled mixture comprising a molybdenum component, a nickel component, pseudo-boehmite powder, and a mineral acid, wherein said calcined particulate is prepared under conditions so that it has specifically defined physical properties including: (a) a total surface area of greater than 160 $m^2/g$ and less than 240 $m^2/g$; (b) a median pore diameter in the range of from 85 Å to 120 Å; (c) from 5% to 30% of the total pore volume of said calcined particulate in the macropores having a pore diameter of 250 Å or greater; and (d) no more than 60% of the total pore volume of said calcined particulate within its pores having a diameter in the range of from 55 Å to 115 Å.

Figure 1:
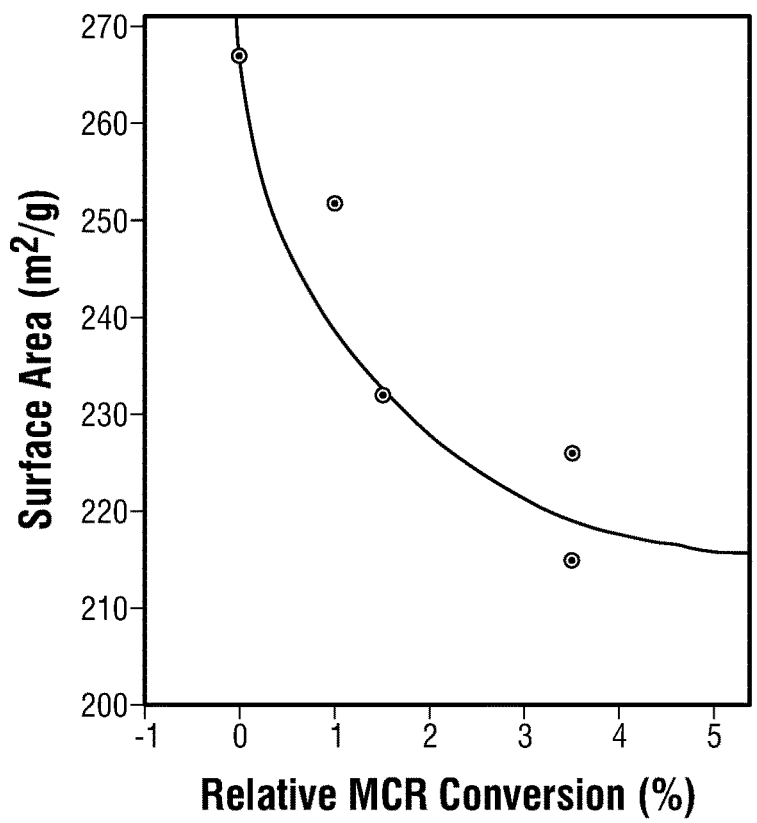
FIG. 1 is a plot of the surface area of each of the comparison and inventive catalyst compositions as a function of the relative gain in percentage MCR conversion provided by each composition.

The inventive catalyst composition is particularly useful in the hydroconversion of heavy hydrocarbon feedstocks. It has a high activity toward the conversion of the micro carbon residue (MCR) content of a heavy hydrocarbon feedstock compared to prior art or comparative catalyst compositions when used in the catalytic hydroconversion of heavy hydrocarbon feedstocks.

One feature of the inventive catalyst composition is that it is a calcined particle, such as an agglomerated particle formed by, for example, extrusion, pressing or balling techniques, of a co-mulled mixture of components that make up the catalyst composition. The components of the co-mulled mixture can comprise or consist essentially of a pseudo-boehmite powder, which is preferably made by the two-step precipitation process or method described herein, a nickel compound, a molybdenum compound, and, optionally, either phosphorus or catalyst fines, or both.

In the preparation of the co-mulled mixture, a mineral acid, which is preferably in an aqueous solution, is also co-mulled with the components and included as a component of the co-mulled mixture. The selection of the mineral acid, control of the pH of the co-mulled mixture, and control of the total amount of water included in the co-mulled mixture are all important parameters in the control of the physical properties of the final calcined particulate of the inventive catalyst and that provide for its enhanced MCR conversion characteristics.

Another important, if not essential, feature of the inventive catalyst composition is that it has relatively low molybdenum content but with a high weight ratio of nickel-to-molybdenum (calculated as $NiO/MoO_3$ regardless of their actual forms).

The inventive catalyst further has a comparatively low surface area and a specifically defined pore size distribution that, in combination along with other features of the catalyst composition, can contribute to its catalytic properties of providing for enhanced MCR conversion as compared to other prior art catalyst compositions. It is unexpected that the particular feature of having a relatively low surface area within a critical range can contribute to the catalyst composition having significantly enhanced MCR conversion capability.

The inventive catalyst composition is to have a specifically defined pore size distribution that can be characterized as being bimodal in structure and in combination with a relatively low surface area. It is believed that the particular pore structure of the catalyst composition in combination with the low surface area provides for the enhanced MCR conversion characteristic of the catalyst.

Thus, it is the low surface area of the catalyst composition within a very specific and narrowly defined range along with a bimodal pore distribution that provide for the unique catalytic properties of the inventive catalyst. The bimodal pore distribution includes a significant portion of the total pore volume of the catalyst that is contained within macropores and a specific and significant portion of the total pore volume that is contained within a specifically defined range of pore diameters.

The inventive catalyst composition is a non-impregnated catalyst in that it is not made by the liquid phase impregnation of a preformed support material for the purpose of incorporating the active metal components therein. Rather, the inventive catalyst composition is a co-mulled mixture of the principal components of the catalyst composition, wherein the co-mulled mixture has been calcined at a relatively high calcination temperature in a gaseous atmosphere, such as air, that has had no significant addition of steam to the gaseous atmosphere. Indeed, it is an important feature of the inventive catalyst composition that it comprises a co-mulled mixture of its components.

Co-mulling of the main components of the catalyst composition provides several benefits over the preparation of a catalyst by impregnation methods. One of these benefits is that the co-mulled catalyst composition is more economical to make than an impregnated catalyst; because, several of the manufacturing steps required for making an impregnated catalyst are not required for making the co-mulled catalyst. For instance, an impregnated catalyst requires the formation of a support particle that often must also be calcined prior to its impregnation with metals. Once the support is impregnated with metals, it is then, typically, calcined a second time.

The co-mulled catalyst composition of the invention, on the other hand, does not require an impregnation step nor does it require the prior preparation of the support particle. A still further benefit of the co-mulled catalyst composition is that the co-mulling may contribute in some way to certain of the beneficial properties of the inventive catalyst composition. The co-mulling accomplishes this by fostering different interaction between the metals and the alumina, leading to better stability of the resulting catalyst, and thus higher performance in an ebullated bed service.

The co-mulling step may also be controlled in such a way as to assist in providing the final calcined agglomerate or particle that has the required physical and pore structure properties as detailed herein as being important.

The molybdenum component is present in the calcined agglomerate of the catalyst composition in an amount that is greater than or equal to 5 wt. % and in an amount that is less than 13 wt. %. It is desirable for the molybdenum component to be present in the calcined agglomerate in an amount in the range of from 6 wt. % to 12 wt. %. It is preferred, however, for the molybdenum component to be present in the calcined agglomerate in an amount in the range of from 7.5 wt. % to 11 wt. %, more preferred, in the range of from 8 wt. % to 11 wt. %, and, most preferred, from 8.5 wt. % to 11 wt. %. These weight percents (wt. %) are based on the total weight of the calcined agglomerate (i.e., the total weight includes the sum of all the individual components of the catalyst composition including the support material, metals, and any other components) and assuming that the molybdenum component is present in the oxide form, i.e., $MoO_3$, regardless of its actual form.

The nickel component is present in the calcined agglomerate of the catalyst composition in an amount such that the weight ratio of the nickel component-to-molybdenum component is at least 0.25, with this weight ratio being computed assuming each of the nickel and molybdenum components being in their respective oxide forms (i.e., the weight ratio of $NiO/MoO_3$), regardless of their actual forms. It is desirable for this weight ratio to be in the range of from 0.25 to 0.8. Preferably, the weight ratio of the nickel component-to-molybdenum component contained in the calcined agglomerate is in the range of from 0.27 to 0.52, and, most preferably, the weight ratio is from 0.3 to 0.42.

The catalyst composition may also include a phosphorous component. The amount of the phosphorous component in the catalyst composition can be in the range of from or about 0.0 wt. % up to or about 6 wt. % (2.63 wt. % elemental phosphorous). Typically, the phosphorous component is present in the catalyst composition in the range of from 0.5 wt % (0.22 wt. % elemental phosphorous) to 5 wt. % (2.19 wt. % elemental phosphorous), and, most typically, from 0.75 (0.33 wt. % elemental phosphorous) to 4 wt % (1.75 wt. % elemental phosphorous). These weight percents (wt. %) are based on the total weight of the catalyst composition and assuming that the phosphorous component is present in the oxide form, i.e., $P_2O_5$, regardless of the form that it is actually in.

As discussed elsewhere herein, the catalyst composition of the invention has a relatively low total surface area, as determined by the nitrogen BET method. It is an unexpected feature of the inventive catalyst composition that in spite of its low total surface area the catalyst composition exhibits enhance MCR conversion characteristics as compared to other prior art catalysts.

As previously noted herein, it is believed that the combination of the relatively low surface area of the inventive catalyst, defined to be within a narrow range of surface area in terms of square meters per gram ($m^2/g$) as determined by the nitrogen adsorption BET method, along with the bimodal pore structure of the inventive catalyst that provides for the unexpected performance benefits of the catalyst. The bimodal pore structure includes a significant proportion of the total pore volume that is contained within macropores and a significant and specifically defined range for the proportion of the total pore volume that is contained within smaller pores thereby providing for the bimodal pore distribution of the catalyst.

As the term is used in this specification, macropores are those pores of the catalyst composition having a pore diameter equal to or greater than 250 Å as determined by the standard mercury penetration porosimetry method referenced herein.

It is a significant feature of the inventive catalyst that the critical upper limit for the surface area is less than about 240 $m^2/g$. A practical lower limit for the surface area is greater than about 160 $m^2/g$. A desirable range for the total surface area of the inventive catalyst is from or about 190 $m^2/g$ to or about 238 $m^2/g$, and, a more preferable range is from or about 195 $m^2/g$ to or about 235 $m^2/g$. Most preferably, the total surface area is in the range of from 200 $m^2/g$ to 230 $m^2/g$.

One attribute of the inventive catalyst is that it has a relatively low surface area, especially when compared with the catalyst of U.S. Pat. No. 8,372,268. This characteristic is a particularly important feature of the invention.

The low surface area characteristic of the inventive catalyst can further and more specifically be defined by the surface area distribution provided by the catalyst pores. The surface area distribution is to be determined with any qualified instrument, such as a Micromeritics ASAP-2400 instrument, applying the method of Barret, Joyner and Halenda (BJH) to calculate the pore size distribution from experimental isotherms using the Kelvin Model of pore filling.

The portion of total surface area of the inventive catalyst that is provided by its pores having diameters of less than or equal to 75 Å can be in the range of from 15% to 40%. It is, however, preferred to minimize this portion relative to the pores having a pore diameter greater than 75 Å. Thus, the portion can be in the range of from 18% to 35%, but, more preferably, it is in the range of from 20% to 30% of the total surface area. It is noted that this portion of total surface area is defined by pores that are either within the lower end of the range of median pore diameters, as measured by $N_2$ desorption, or even outside and below the range of median pore diameters. These median pore diameters are discussed elsewhere herein.

As earlier mentioned, the catalyst composition has a relatively low total surface area and a specifically defined pore structure that along with other features of the catalyst composition are believed to provide for and contribute to its capability of providing for enhanced MCR conversion when used in the hydroconversion of a heavy hydrocarbon feedstock.

The pore volume distribution of the catalyst, as determined by mercury intrusion should be such that no more than about 65% of the total pore volume of the catalyst is present as pores having a diameter in the range of from 55 Å to 115 Å. It has been found that incremental improvements in the MCR conversion characteristic of the catalyst composition are provided by lowering the percentage of its total pore volume contained in the pores having a diameter in the range of from 55 Å to 115 Å to some lower range but that there is a limit to which such reduction provides a benefit. It is desirable that no more than 60% of the total pore volume of the catalyst is present as pores having a diameter in the range of from 55 Å to 115 Å, but it is more favorable for the proportion of total pore volume to be less than 55%.

The lower limit for the proportion of total pore volume of the catalyst contained in pores of diameter in the range of from 55 Å to 115 Å should be greater 30%, and, preferably greater than 35% or, more preferably, greater than 40%.

More significant improvements in the MCR conversion characteristics of the inventive catalyst may be achieved by the control of the proportion of the its total pore volume that is contained the pores of diameter in the range of from 50 Å to 100 Å.

It is recognized that there is a critical upper limit for the proportion of total pore volume of the inventive catalyst that is contained within its pores of a pore diameter within the range of from 50 Å to 100 Å in order to contribute to providing or imparting the improved or enhanced MCR conversion properties of the catalyst. This upper limit is less than about 49% of the total pore volume of the catalyst. It is desirable for it to be from or about 10% to or about 45% of the total pore volume of the catalyst to be contained within the pores of a pore diameter within the range of from 50 Å to 100 Å. Preferably, from 15% to 40% of the total pore volume is to be contained within pores of diameter in the range of from 50 Å to 100 Å, and, more preferably, from 15% to 38% or from 20% to 35% of the total pore volume is contained within the pores of these diameters.

One feature of the inventive catalyst is that the portion of its total pore volume within the pores having a pore diameter in the range of from 50 Å to 100 Å is less than the portion of its total pore volume in the pores having a pore diameter in the range of from 100 Å to 150 Å. Therefore, a portion of the total pore volume contained in pores of pore diameter in the range of from 100 Å to 150 Å is in the range of from 20% to 60%, preferably, from 25% to 55%, and, most preferably, from 30% to 50%.

The catalyst further should include from 5% to 30% of the total pore volume that is present as pores having diameters of greater than or equal to 250 Å, or from 6% to 28% of the total pore volume of the catalyst is present as pores having diameters of greater than or equal to 250 Å. It is preferred for the percentage of the total pore volume present as pores of having diameters of greater than or equal to 250 Å, to be in the range of from 7% to 25%, and, most preferred, from 8% to 22%.

The total pore volume of the catalyst composition is, generally, at least 0.6 cc/g, and, typically is in the range of from 0.6 cc/g to 1.1 cc/g. More typically, the total pore volume is in the range of from 0.65 cc/g to 1.05 cc/g, and, most typically, it is in the range of from 0.7 cc/g to 1 cc/g.

Another property of the inventive catalyst thought to be necessary to provide for or contribute to its enhanced MCR conversion characteristic is related to its median pore diameter. It has been found that there is a lower limit to the median pore diameter at which incremental improvements in the catalyst MCR conversion characteristic are no longer obtained by incremental increases in the median pore diameter. This lower limit in the median pore diameter, as determined by mercury intrusion, is greater than about 82.5 Å, and the practical upper limit for the median pore diameter of the catalyst appears to be no greater than 120 Å. It is preferred for the inventive catalyst to have a median pore diameter in the range of from 85 Å to 120 Å. It is even more preferred for the median pore diameter to be in the range of from 87.5 Å to 115 Å, and, most preferred, 90 Å to 110 Å.

The term "median pore diameter," as it is used throughout this specification, means the pore diameter at which 50% of the total surface area is found in pores of smaller diameters and 50% of the total surface area is found in pores of larger diameters, with the surface area distribution being either derived from nitrogen desorption data or from mercury intrusion data, as the case may be.

The median pore diameter of the inventive catalyst, thus, may also be characterized by its values as measured by the $N_2$ desorption method, which is defined elsewhere herein. The median pore diameter of the inventive catalyst, as measured by $N_2$ desorption, can be in the range of from 70 Å to 105 Å. It is more desirable for the MPD to be in the range of from 80 Å to 100 Å, but, preferably, it is in the range of from 82.5 Å to 98 Å, and, more preferably, from 85 Å to 95 Å, with it being understood that the values reported in this paragraph are as determined by the $N_2$ desorption method of measurement. This median pore diameter may be referred to herein as nitrogen median pore diameter so as to distinguish it over the median pore diameter that is determined by mercury intrusion.

The references herein to the pore size distribution and pore volume of the catalyst composition are to those properties as determined by mercury penetration porosimetry. The measurement of the pore size distribution of the catalyst composition is by any suitable mercury porosimeter capable of working in the pressure range between atmospheric pressure and about 60,000 psi, using a contact angle of 130° with a mercury surface tension of 484 dyne/cm at 25° C. Pore volume is defined as the total volume using the mercury intrusion method as measured between atmospheric pressure and a pressure of about 60,000 psia.

In the co-mulled mixture of the inventive catalyst composition the starting materials or components include alumina powder, a nickel compound and a molybdenum compound. The starting components may also include a phosphorus compound or catalyst fines, or both, in addition to the aforementioned alumina, nickel and molybdenum as well as water or acid, or both.

The nickel compound may be introduced into the co-mulled mixture as an aqueous solution of a nickel salt. The molybdenum compound may also be introduced into the co-mulled mixture as an aqueous solution of a molybdenum salt.

The co-mulled mixture is formed into particles, such as extrudates, that are then calcined in air at a calcination temperature within a certain range to thereby provide the final catalyst composition. It is believed that this co-mulling may provide for a final catalyst having catalytic or physical, or both, properties that are distinguishable over those of other hydroprocessing catalysts that have been prepared by a different method, such as, for example, by impregnation.

The term "co-mulling" is used broadly in this specification to mean that at least the recited starting materials are mixed together to form a mixture of the individual components that is preferably substantially uniform or homogeneous. This term is intended to be broad enough in scope to include the mixing of the starting materials so as to yield a paste that exhibits properties making it capable of being extruded or formed into extrudate particles by any of the known extrusion methods.

The term "co-mulling" is also intended to encompass the mixing of the starting materials so as to yield a mixture that is preferably substantially homogeneous and capable of being agglomerated into formed particles, such as, extrudates, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling. The preferred method of agglomerating the mixture is by extrusion to form extrudate particles, typically, having diameters in the range of from 0.3969 mm (1/64 inch) or 0.79375 mm (1/32 inch) to 12.7 mm (½ inch) and length to diameter ratios of from 0.2 to 10 or even higher.

Thus, the formation of the co-mulled mixture may be done by any method or means known to those skilled in the art, including, but not limited to, the use of such suitable types of solids-mixing machines as muller mixers, which are either batch type or continuous type, and impact mixers, and the use of such suitable types of either batch-wise or continuous mixers for mixing solids and liquids or for the formation of paste-like mixtures that are extrudable.

The mixing of the starting materials used in the preparation of the co-mulled mixture may be conducted during any suitable time period necessary to properly homogenize the co-mulled mixture. Generally, the blending time may be in the range of upwardly to 12 or more hours. Typically, the blending time is in the range of from 0.1 hours to 3 hours.

This mixing step preferably includes mulling, which provides a homogeneous extrudable paste. The mulling includes breaking of the alumina powder particles into smaller sizes and in amounts required so as to provide for the inventive catalyst having the unique pore structure features as described in detail herein.

It is further noted that the amounts of acid, water that is contained in each of the ingredients, and free water that is added to the mixture are all parameters that impact the final pore structure features of the inventive catalyst. These are among the parameters that are controlled in order to provide the inventive catalyst with its novel characteristics and features.

The mulling time is more typically controlled to be in the range of from 0.16 hours to 2 hours. This mulling time can also affect the final properties of the inventive catalyst and is one of the preparation parameters that can be controlled to provide the inventive catalyst with its novel pore structure features.

The control of the amounts of acid, water and time applied in the preparation of the co-mulled mixture is done so as to provide the inventive catalyst with its unique properties as described herein.

It is further noted that the properties of the inventive catalyst can also be impacted by the characteristics of the starting boehmite. This boehmite material is described below.

The alumina powder component used in the formation of the co-mulled mixture comprises particles of alumina. The alumina is preferably predominantly in the pseudo-boehmite crystalline form ($Al_2O_3 \cdot xH_2O$ where x is an intermediate value between x=1 boehmite and x=3 gibbsite), with about 20 wt. % to 30 wt. % water content.

The boehmite powder used in the preparation of the co-mulled mixture should have good dispersibility. Dispersibility is the ability of the boehmite particles to easily break down to smaller particles during the mulling step. The boehmite may be characterized by its pore volume, median pore diameter and surface area, after it has been calcined under standard time and temperature conditions.

Dispersibility of a boehmite powder can be measured for the purpose of comparing different powders and quantifying the differences in their behavior. Dispersibility is determined by making a slurry of boehmite particles followed by measuring the particle size distribution. The slurry is made by adding a given amount of powder, such as 4.8 grams of dry basis powder, to a given amount of a dilute acid solution, such as a 0.25 Normal nitric acid solution, and stirring the slurry under prescribed conditions, defined by such factors as stirrer design, stirring speed and stirring time, followed by measuring the boehmite particle size distribution of the resulting stirred slurry. This measurement is done using any suitable piece of equipment capable of measuring particle sizes and size distributions in the range of from 0.01 to 100 micron. An example of a suitable measurement device is the Micromeritics SediGraph 5100.

The dispersibility index of a powder is the weight percent of the boehmite particles having a size smaller than a specified size. A powder having a higher dispersibility index should be expected to require milder mulling conditions, such as lower acid content or a lower mulling time, than required for a powder having a lower dispersibility index.

Surface area, pore volume and median pore diameter are measured after calcining a given amount of powder under well prescribed conditions; and, then, measuring its mercury intrusion between atmospheric pressure and 60,000 PSI. The powder pore volume of interest for predicting the extrudate pore volume is the volume that represents the powder microporosity, excluding the spaces between agglomerated particles.

A wide range of boehmite powders can suitably be used as a starting material in the preparation of the co-mulled mixture. The properties of the starting boehmite powder, however, impact the mixing and mulling conditions of mulling time, mix acid content, and mix moisture content required to obtain the novel pore structure characteristics of the inventive catalyst.

Boehmite powder, which has not been calcined, is used as a starting material instead of other various phases of alumina, such as γ-alumina. However, there are practical limitations on the calcination temperature at which the co-mulled mixture may be calcined. This temperature limitation results from the presence of the co-mulled metals that are contained in the co-mulled mixture. This upper limit for the calcination temperature is around 1550° F. Hence it is desirable to select a boehmite powder as a component of the co-mulled mixture that forms a high median pore diameter powder using a reasonable calcination temperature. This provides for the unique characteristics of the inventive catalyst of having a relatively low surface area and relatively high median pore diameter.

A particularly preferred pseudo-boehmite powder that may be used as a component in the preparation of the co-mulled mixture of the inventive catalyst is powder that is prepared by the so-called two-step precipitation process. This preparation method is described in great detail in U.S. Pat. No. 7,790,652, which patent is incorporated herein by reference.

There are numerous other methods for preparing pseudo-boehmite powder that are described in the art, but it is believed that the powder prepared by the two-step precipitation process may have certain properties or physical characteristics that make it particularly suitable for use in the preparation of the co-mulled mixture and that contribute to the enhanced MCR conversion characteristics of the inventive catalyst derived from the co-mulled mixture.

The first step of the two-step precipitation process includes forming a first aqueous slurry of alumina by admixing, in a controlled fashion within a first precipitation zone, a first aqueous alkaline solution of at least one alkaline compound selected from the group consisting of sodium aluminate, potassium aluminate, ammonia, sodium hydroxide, and potassium hydroxide with a first aqueous acidic solution of at least one acidic compound selected from the group consisting of aluminum sulfate, aluminum chloride, aluminum nitrate, sulfuric acid, hydrochloric acid, and nitric acid. The mixing of the first aqueous alkaline solution and the first aqueous acidic solution requires that either the alkaline compound of the first aqueous alkaline solution or the acidic compound of the first aqueous acidic solution, or both the alkaline compound and the acidic compound of such solutions, be a compound containing aluminum. For example, the alkaline compound of the first aqueous alkaline solution that is an aluminum containing compound is either sodium aluminate or potassium aluminate, and the acidic compound of the first aqueous acidic solution that is an aluminum containing compound is either aluminum sulfate or aluminum chloride or aluminum nitrate.

The first aqueous alkaline solution and the first aqueous acidic solution are mixed together in such proportions as to thereby maintain a first pH of the resulting first aqueous slurry in the range of from about 8 to about 11, preferably, from 8.5 to 10.5. The first aqueous alkaline solution and the first aqueous acidic solution are also admixed together in such quantities as to thereby provide the first aqueous slurry that contains a first desired amount of alumina that is in the range of from about 25 weight % to about 35 weight % of the total alumina made by the two-step precipitation process. The temperature within the first precipitation zone and at which the mixing step is conducted is maintained or controlled at a first aqueous slurry temperature in the range of from about 20° C. to about 40° C., preferably, from 25 to 30° C.

When the first desired amount of alumina has been formed in the first step, the temperature of the resulting first aqueous slurry is thereafter increased from the first aqueous slurry temperature to a temperature adjusted first aqueous slurry temperature that is in the range of from about 45° C. to about 80° C., preferably, from 50 to 65° C. This raising of the temperature of the first aqueous slurry can be done by heating the first aqueous slurry either while it is contained within the first precipitation zone or as it is transferred into a second precipitation zone or after it has been transferred into and while it is contained within the second precipitation zone. It is preferred to heat the first aqueous slurry to the temperature adjusted first aqueous slurry temperature while it is contained within the first precipitation zone.

The second step of the two-step precipitation process can be conducted either in the first precipitation zone or in a second precipitation zone. It is preferred to transfer the first aqueous slurry, which has been heated to the temperature adjusted first aqueous slurry temperature, to the second precipitation zone wherein the second step of the two-step precipitation process is conducted. This preferred embodiment of transferring the first aqueous slurry into a separate, second precipitation zone and conducting the second step of the two-step precipitation process allows for better control of the properties of the final alumina product obtained from the two-step precipitation process, and it provides for the final alumina product that has enhanced desired physical properties making it suitable for use in the alumina support material.

A second aqueous slurry is thus formed by admixing in a controlled fashion, and, preferably, within a second precipitation zone with the temperature adjusted first aqueous slurry, a second aqueous alkaline solution of at least one alkaline compound selected from the group consisting of sodium aluminate, potassium aluminate, ammonia, sodium hydroxide, and potassium hydroxide and a second aqueous acidic solution of at least one compound selected from the group consisting of aluminum sulfate, aluminum chloride, aluminum nitrate, sulfuric acid, hydrochloric acid, and nitric acid. The mixing of the second aqueous alkaline solution and the second aqueous acidic solution requires that either the alkaline compound of the second aqueous alkaline solution or the acidic compound of the second aqueous acidic solution, or both the alkaline compound and the acidic compound of such solutions, be a compound containing aluminum. For example, the alkaline compound of the second aqueous alkaline solution that is an aluminum containing compound is either sodium aluminate or potassium aluminate, and the acidic compound of the second aqueous acidic solution that is an aluminum containing compound is either aluminum sulfate or aluminum chloride or aluminum nitrate.

The second aqueous alkaline solution and the second aqueous acidic solution are admixed with the first aqueous slurry in the second step of the two-step precipitation process in such amounts and proportions as to thereby provide the second aqueous slurry having a second pH in the range of from about 8.5 to 10.5, preferably, from 8.5 to 9. Also, the second aqueous alkaline solution and the second aqueous acidic solution are admixed with the first aqueous slurry in such quantities as to form the remaining amount of alumina made by the two-step precipitation process. The temperature at which the adding step is conducted is maintained or controlled so that a second aqueous slurry temperature is in the range of from about 45° C. to about 80° C., preferably, from 50 to 65° C. The alumina concentration in the final second aqueous slurry should be such that from about 4 weight percent to about 8 weight percent of the total weight thereof is alumina ($Al_2O_3$), based on the alumina precipitate being calcined. Preferably, the final second aqueous slurry contains from 6 weight percent to 6.5 weight percent alumina (on calcined basis).

At least a portion of the alumina contained in the second aqueous slurry is recovered therefrom by any suitable method or means known to those skilled in the art. Suitably, the final alumina of the second aqueous slurry is filtered and washed with any suitable solvent, for example, water, in accordance with methods known to those skilled in the art in order to remove from the filter cake water soluble contaminants such a sodium, sulfate, chloride, and the like. The washed filter cake can be used directly in the preparation of the alumina support material or it can be dried to produce a powder of alumina that is used in the preparation of the alumina support material. The filter cake can be dried by any suitable method or means known to those skilled in the art, such as, for example, tray drying, belt drying, flash drying or spray drying. A preferred method that can be used to provide a suitable alumina for use in forming the alumina support material is to spray dry or flash dry a slurry of the alumina obtained from the second aqueous slurry.

As noted, it is believed that the prepared alumina formed in the two-step precipitation process has special physical properties that make it uniquely suitable for use as a component of the co-mulled mixture and inventive catalyst. The prepared alumina comprises alumina in the form of pseudo-boehmite. More particularly, the prepared alumina made by the two-step precipitation process comprises substantially entirely pseudo-boehmite wherein the alumina comprises at least 90 weight percent thereof pseudo-boehmite.

The nickel compound used in the preparation of the co-mulled mixture is any suitable nickel compound that is convertible to a nickel oxide form by calcination in air under the calcination conditions as defined herein. Possible suitable nickel compounds include nickel oxides, nickel carbonates, nickel hydroxides, and nickel nitrates. One particularly suitable nickel compound is nickel nitrate.

The molybdenum compounds used in the preparation of the co-mulled mixture can be molybdenum oxide and any other suitable molybdenum compound that is convertible to a molybdenum oxide form by calcination in air under the calcination conditions as defined herein. Possible suitable molybdenum compounds include molybdenum oxides, molybdenum oxide hydrates and molybdates. One particularly suitable molybdenum compound is ammonium heptamolybdate.

To help control the microporosity (as defined elsewhere herein) of the catalyst composition, in one embodiment of the invention, the fines of an already prepared hydroprocessing catalyst, that is preferably a fresh or unused hydroprocessing catalyst, that contains nickel, molybdenum and phosphorous components supported on an alumina support is mixed or co-mulled along with the alumina powder, the nickel compound, the molybdenum compound, and, optionally, the phosphorus compound, acid and water that form the co-mulled mixture. Fines from other types of catalysts or alumina supports may also be employed, including used hydroprocessing catalyst that has been regenerated in full or in part or not at all.

The fresh hydroprocessing catalyst from which the catalyst fines are prepared may be selected from commercially available hydroprocessing catalyst products, which include typical impregnated catalysts, or it may be obtained from the processing of the co-mulled catalyst composition of the instant invention. The hydroprocessing catalyst from which the catalyst fines are derived generally has a Group VI-B hydrogenation metal content in the range of from 1 to 35 wt. %, calculated as trioxide (e.g., $MoO_3$), a Group VIII hydrogenation metal content in the range of from 1 to 10 wt. %, calculated as oxide (e.g., NiO), and, optionally, a phosphorus content in the range upwardly to 10 wt. %, calculated a $P_2O_5$. The hydroprocessing catalyst fines generally have a mean pore diameter in the range of from 40 Å to 150 Å.

To prepare the catalyst fines used in the blending with the other components of the co-mulled mixture, the material (e.g., hydroprocessing catalyst) is ground into a powder containing catalyst particles wherein at least 90 wt. % are able to pass through the mesh of a sieve No. 40 (nominal sieve opening of 0.420 mm). Any suitable equipment known to those skilled in the art that is capable of grinding the material into particles to form a powder may be used to prepare the catalyst fines with average particle size between 5 and 50 microns (where one micron=$10^{-6}$ meters). An example of one such piece of equipment is a conventional hammer mill.

The amount of catalyst fines mixed with the other components of the co-mulled mixture is such as to help control the microporosity of the final catalyst composition of the invention to within the desired ranges as described herein. Thus, the amount of catalyst fines contained in the co-mulled mixture can be in the range upwardly to 50 weight percent (typically from 0 wt. % to 30 wt. %) of the total weight, on a dry basis, of the alumina powder or powders and catalyst fines that make up the catalyst.

In other embodiments of the invention, the co-mulled mixture may have from 1 wt. % to 40 wt. % catalyst fines based on the total weight of the alumina powder and/or other powders of the catalyst, or even from 5 wt. % to 30 wt. %.

The amount of catalyst fines added to and mixed in the co-mulled mixture may also be controlled so as to introduce a desired amount of phosphorus, or silica, or both phosphorus and silica. The introduction of either phosphorus or silica can be controlled so as to not have a negative effect upon the extrudability of the co-mulled mixture or the final pore structure properties of the calcined particle.

The conditions under which the particles of the co-mulled mixture are calcined, in addition to the aforedescribed preparation parameters, can also impact the surface area and other pore structure characteristics of the final calcined particle of the invention. It is required for the particles formed by agglomerating the co-mulled mixture to be calcined in air under suitable calcination conditions so as to provide the final catalyst composition of the invention.

The calcination conditions should be such as to convert the nickel and molybdenum compounds of the co-mulled mixture and agglomerate to oxide forms and to provide a final catalyst composition having the desired surface area and pore volume distribution as described herein.

The calcination of the agglomerate formed from the co-mulled mixture, preferably, should not be a hydrothermal-type calcination, which is an exposure of the agglomerate to an atmosphere of air with a significant presence of steam at a reasonably high temperature. Rather, the calcination of the agglomerate should be in the presence of an air atmosphere having no material or significant addition of steam.

Thus, the calcination of the agglomerate may be conducted in an atmosphere of air that has a concentration level of water that is typically observed in air at standard conditions, but there should be no material addition of water to the heated air beyond that which is naturally contained in air.

A material addition of water is an amount of water that is added to the heated air used in the calcination of the agglomerate that would materially affect the final properties of the calcined agglomerate or final catalyst composition of the invention.

An example of air that may suitably be used in the calcination of the agglomerate of the co-mulled mixture is air that is saturated with water at a temperature of 60° F. and 1 atmosphere of pressure.

The temperature at which the particles of the co-mulled mixture are calcined, among other factors, affects the final properties of the calcined particle. It is understood that the resulting pore diameter of the calcined particle has a direct relationship to its calcination temperature with the pore diameter increasing with an increasing calcination temperature, and the resulting surface area of the calcined particle has a reverse relationship to its calcination temperature with the surface area decreasing with an increasing calcination temperature.

Various other factors that can also impact the calcination temperature required to provide the calcined particle having the unique properties, also include, as discussed above, the types and quantities of the components in the co-mulled mixture and the equipment used in its preparation.

It is preferred to calcine the particles of the co-mulled mixture using an inclined rotatory kiln. Typically, the calcination time within the kiln is in the range of from 0.1 hrs. to 10 hrs., preferably from 0.2 hrs. to 8 hrs., and most preferably, from 0.25 hrs. to 2 hrs.

There can be a host of other variables associated with the kiln calciner that can impact in some way the required calcination temperature. Some of these variables include the type of kiln, or the axial temperature profile within the kiln, the angle of incline, the placement of control thermocouples, etc.

Considering the above-noted factors that can affect the temperature required for the calcination of the particles of the co-mulled mixture, the calcination temperature should generally exceed 621° C. (1150° F.) but be less than 843° C. (1550° F.). The preferred range for the calcination temperature is from 635° C. (1175° F.) to 843° C. (1550° F.), and, a more preferred range for the calcination temperature is from 649° C. (1200° F.) to 815° C. (1500° F.). The most preferred calcination temperature is in the range of from 663° C. (1225° F.) to 815° C. (1500° F.).

The heavy hydrocarbon feedstock of the invention can be obtained from any suitable source of hydrocarbons, including, for example, petroleum crude oils and tar sand hydrocarbons, such as, heavy oils extracted from tar sand. The heavy hydrocarbon feedstock can be a vacuum resid or atmospheric resid component of a petroleum crude oil or tar sand hydrocarbon. One potential source of the heavy hydrocarbon feedstock is from an oil sand, such as any of those that are recovered in many areas of Canada, that have been topped by atmospheric distillation and vacuum distilled.

The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydroprocessing so challenging.

The heavy hydrocarbon feedstock, thus, includes a mixture of hydrocarbons derived from a crude oil or tar sand hydrocarbon material or other source of heavy hydrocarbons. A major portion of the heavy hydrocarbons of the mixture has a boiling temperature exceeding about 343° C. (650° F.). In addition, a portion, preferably a major portion, of the heavy hydrocarbons of the mixture has a boiling temperature exceeding about 538° C. (1000° F.). The preferred heavy hydrocarbon feedstock has a boiling range such that at least 50 weight percent boils at a temperature exceeding 538° C. (1000° F.), and, most preferably, at least 85 weight percent of the heavy hydrocarbon feedstock boils at a temperature exceeding 538° C. (1000° F.). The boiling ranges referenced herein are as determined by ASTM test procedure D-1160. The API gravity of the heavy hydrocarbon feedstock can range from about 0 to about 20, but, more specifically, the API gravity is in the range of from 3 to 15, and, more specifically, from 4 to 11.

The heavy hydrocarbon feedstock can also have a micro carbon residue (MCR) content, as determined by ASTM testing method D-4530, exceeding 10 weight percent, and, more specifically, the MCR content exceeds 12 weight percent, and, most specifically, it exceeds 14 weight percent. A potential upper limit for the MCR content is less than 40 weight percent.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 2 to 10 weight percent, or from 4 to 10 weight percent.

The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.2 to 3 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 10 parts per million by weight (ppmw) to 500 ppmw, or from 40 to 500 ppmw.

The vanadium concentration in the heavy hydrocarbon feedstock can exceed 50 ppmw or it can exceed 100 ppmw. More specifically, the vanadium concentration in the heavy hydrocarbon feedstock can be in the range of from 50 ppmw to 1500 ppmw.

The process of the invention includes contacting the heavy hydrocarbon feedstock, preferably in the presence of hydrogen, with the catalyst composition of the invention under suitable hydroprocessing conditions. The inventive process provides for an exceptionally high percentage conversion of the pitch, MCR and sulfur contents of the heavy hydrocarbon feedstock.

While it is recognized that the term "pitch" may have different definitions by and among hydroprocessing operators depending upon their experience and local custom, as the term is used in this specification, except as otherwise specified, and in the claims it refers to the hydrocarbon molecules contained in the fraction of the heavy hydrocarbon feedstock that boil at temperatures above 510° C. (950° F.).

The percent conversion of MCR is defined as being the weight percent of MCR contained in the heavy hydrocarbon feedstock that is converted by the hydroconversion process, and it can be represented by the ratio of the difference between the MCR in a feed and the MCR in the product with the resulting difference being divided by the MCR in the feed and the resulting ratio being multiplied by 100 to provide the percentage MCR conversion.

The hydroconversion process can be carried out by the use of any suitable reaction means or system including fixed bed, moving bed, fluidized bed and ebullated bed reactor systems. While the inventive catalyst composition can be used as a part of any suitable reactor system, its properties make it particularly suitable for use in ebullated bed systems.

The hydroprocessing conditions under which the heavy hydrocarbon feedstock is contacted with the hydroconversion catalyst composition of the invention include those process conditions that are effective in providing for a hydrotreated product and, preferably, that are effective in the conversion of a significant portion of the MCR component of the heavy hydrocarbon feedstock.

Suitable hydroprocessing conditions under which the heavy hydrocarbon feedstock is contacted with the hydroconversion catalyst composition of the invention can include a hydroconversion contacting temperature in the range of from about 300° C. (572° F.) to about 700° C. (1292° F.), a hydroconversion total contacting pressure in the range of from about 500 psia to about 6,000 psia, which includes a hydrogen partial pressure in the range of from about 500 psia to about 3,000 psia, a hydrogen addition rate per volume of heavy hydrocarbon feedstock in the range of from about 500 SCFB to about 10,000 SCFB, and a hydroconversion liquid hourly space velocity (LHSV) in the range of from about 0.2 $hr^{-1}$ to 5 $hr^{-1}$.

The preferred hydroconversion contacting temperature is in the range of from 310° C. (590° F.) to 650° C. (1202° F.), and, most preferred, from 316° C. (600° F.) to 600° C. (1112° F.).

The preferred hydroconversion total contacting pressure is in the range of from 500 psia to 3,000 psia, most preferably, from 1,000 psia to 2,850 psia, with a preferred hydrogen partial pressure of from 800 psia to 2,000 psia, and most preferred, from 1,000 psia to 1,850 psia.

The LHSV is preferably in the range of from 0.2 $hr^{-1}$ to 4 $hr^{-1}$, and, most preferably, from 0.2 $hr^{-1}$ to 3 $hr^{-1}$. The hydrogen addition rate is preferably in the range of from 600 SCFB to 8,000 SCFB, and, more preferably, from 700 SCFB to 6,000 SCFB.

The unique properties of the inventive catalyst composition allow for a significant improvement in the operation of existing hydroconversion process systems by the replacement of the catalyst that has been used in such systems with the inventive catalyst composition that exhibits the above-described enhanced MCR hydroconversion properties.

The following Examples are presented to illustrate the invention, but they should not be construed as limiting the scope of the invention.

EXAMPLE 1

This example presents certain of the physical properties of the pseudo-boehmite powder used in the catalyst preparations discussed in Example 2 and the method of preparing the pseudo-boehmite powder.

The pseudo-boehmite powder was commercially produced using the so-called two-step precipitation process that is described in detail in U.S. Pat. No. 7,790,652, which is incorporated herein by reference.

Presented in Table 1 are selected properties of the pseudo-boehmite powder used in the preparation of the catalyst compositions described in Example 2. It is believed that the two-step precipitation process by which the pseudo-boehmite powder is prepared may be responsible for providing a powder having certain properties, perhaps due to its unique crystalline structure or due to other physical features of the powder, which are at least partially responsible for imparting improved catalytic performance to the final catalyst compositions described herein.

TABLE 1

Properties of pseudo-boehmite used for catalyst examples

| Powder Identity | P1 | P2 |
|---|---|---|
| Power loss on ignition (LOI), wt % | 25.4 | 26.6 |
| Powder surface area (SA), m$^2$/g | 298 | 290 |
| Powder Pore volume, g/cm3 | 0.922 | 0.904 |
| Powder median pore diameter (MPD), A | 113 | 117 |
| Powder dispersibility index (DI), wt % | 37 | 43 |

EXAMPLE 2

This Example 2 describes the preparations of the inventive catalysts and comparison catalysts that were tested for performance as described in Example 4.

Catalyst C1

A co-mulled mixture was prepared by mixing in a muller mixer 37.82 parts P1 powder, 8.35 parts catalyst fines (comprising γ-alumina, MoO$_3$, NiO, P$_2$O$_5$), 3.22 parts ammonium dimolybdate, 3.86 parts nickel nitrate, 0.69 parts 70% nitric acid and 46.07 parts water, and mulling for 35 minutes. The co-mulled mixture was then extruded into cylindrical extrudates that were dried in air at an approximate temperature of 250° F. for about 4 hours. Thereafter, the dried extrudates were calcined in air for 1 hour at a temperature of 1340° F.

Catalyst C2

A co-mulled mixture was prepared by mixing in a muller mixer 37.82 parts P1 powder, 8.35 parts catalyst fines (comprising γ-alumina, MoO$_3$, NiO, P$_2$O$_5$), 3.22 parts ammonium dimolybdate, 3.86 parts nickel nitrate, 0.69 parts 70% nitric acid and 46.07 parts water, and mulling for 35 minutes. The co-mulled mixture was then extruded into cylindrical extrudates that were dried in air at an approximate temperature of 250° F. for about 4 hours. Thereafter, the dried extrudates were calcined in air for 1 hour at a temperature of 1400° F.

Catalyst C3

A co-mulled mixture was prepared by mixing in a muller mixer 36.13 parts P1 powder, 8.11 parts catalyst fines (comprising γ-alumina, MoO$_3$, NiO, P$_2$O$_5$), 3.12 parts ammonium dimolybdate, 3.75 parts nickel nitrate, 0.24 parts 70% nitric acid and 48.65 parts water, and mulling for 35 minutes. The co-mulled mixture was then extruded into cylindrical extrudates that were dried in air at an approximate temperature of 250° F. for about 4 hours. Thereafter, the dried extrudates were calcined in air for 1 hour at a temperature of 1435° F.

Catalyst C4

A co-mulled mixture was prepared by mixing in a muller mixer 36.97 parts P1 powder, 8.29 parts catalyst fines (comprising γ-alumina, MoO$_3$, NiO, P$_2$O$_5$), 3.20 parts ammonium dimolybdate, 3.83 parts nickel nitrate, 0.59 parts 70% nitric acid and 47.12 parts water, and mulling for 35 minutes. The co-mulled mixture was then extruded into cylindrical extrudates that were dried in air at an approximate temperature of 250° F. for about 4 hours. Thereafter, the dried extrudates were calcined in air for 1 hour at a temperature of 1435° F.

Catalyst C5

A co-mulled mixture was prepared by mixing in a muller mixer 37.58 parts P2 powder, 8.29 parts catalyst fines (comprising γ-alumina, MoO$_3$, NiO, P$_2$O$_5$), 3.2 parts ammonium dimolybdate, 3.83 parts nickel nitrate, 0.59 parts 70% nitric acid and 46.51 parts water, and mulling for 35 minutes. The co-mulled mixture was then extruded into cylindrical extrudates that were dried in air at an approximate temperature of 250° F. for about 4 hours. Thereafter, the dried extrudates were calcined in air for 1 hour at a temperature of 1435° F.

EXAMPLE 3

This example 3 presents properties of the catalysts resulting from the preparations described in Example 2. Note that Catalyst C1 represents the inventive catalyst of U.S. Pat. No. 8,372,268.

TABLE 2

Selected physical and chemical properties of catalysts

| Catalyst ID | C1 | C2 | C3 | C4 | C5 |
|---|---|---|---|---|---|
| MoO3, wt % | 10.8 | 10.8 | 10.8 | 10.8 | 10.8 |
| NiO, wt % | 3.4 | 3.4 | 3.4 | 3.4 | 3.4 |
| NiO/MoO3 ratio | 0.3 | 0.32 | 0.32 | 0.32 | 0.32 |
| P, wt % | 0.5 | 0.5 | 0.5 | 0.5 | 0.5 |
| CBD, g/ml | 0.55 | 0.544 | 0.471 | 0.542 | 0.54 |
| Powder | P1 | P1 | P1 | P1 | P2 |
| SA, m2/g | 267 | 252 | 232 | 226 | 215 |
| MPD by SA from N2 desorption | 75.2 | 81.2 | 88.6 | 89.1 | 92.3 |
| % SA from pores < 60 A | 26.1 | 19.1 | 14.8 | 14.5 | 12.6 |
| % SA from pores < 75 A | 51.5 | 39.1 | 28.5 | 28.6 | 25.7 |
| % SA from pore range 75 A-135 A | 45.2 | 54.3 | 61.7 | 62.1 | 63.3 |
| % SA from pores > 135 A | 6.4 | 6.4 | 9.8 | 9.3 | 10.9 |
| Total PV by Hg intrusion, cc/g | 0.78 | 0.78 | 0.95 | 0.81 | 0.80 |
| Hg-MPD(SA), A | 81 | 88 | 102 | 102 | 108 |
| vol % in 55-115 A | 67.40 | 65.30 | 45 | 50.70 | 43.16 |
| vol % 50-100 A | 59.4 | 53.5 | 27.8 | 30.6 | 21.7 |
| vol % 100-150 A | 18.4 | 24.0 | 33.0 | 39.3 | 45.8 |
| vol % 100-200 A | 23.5 | 29.8 | 40.7 | 47.9 | 56.0 |
| vol % > 160 A | 19.5 | 20.1 | 36.8 | 27.3 | 29.3 |
| vol % > 250 A | 13.3 | 13.3 | 28.0 | 17.6 | 18.0 |
| Vol % < 80 A, cc/g | 32.9 | 21.0 | 6.4 | 7.4 | 5.6 |
| Vol % in pores < 1000 A | 5.4 | 5.1 | 19.9 | 7.9 | 7.6 |
| Vol % in pores < 5000 A | 0.7 | 0.6 | 2.3 | 1.1 | 0.9 |
| vol % < 100 A | 60.7 | 54.3 | 28.0 | 30.9 | 21.9 |
| vol % 100-160 | 19.8 | 25.6 | 35.2 | 41.8 | 48.8 |
| vol % > 200 | 15.8 | 15.9 | 31.3 | 21.2 | 22.1 |
| Mode, A | 75.0 | 85.0 | 97.0 | 100.0 | 105.0 |

EXAMPLE 4

This Example 4 describes the experimental testing procedure and conditions used to test the catalysts described in the above Examples for their hydro-conversion performance Each catalyst composition was tested for its catalytic performance in the hydroprocessing and hydroconversion of a heavy hydrocarbon feed. The heavy hydrocarbon feed used in the performance test was a blend of bitumen vacuum residue from Canadian Oil Sands (90 wt %), heavy aromatic oil (5 wt %) and heavy gas oil (5%) with properties as follow: density of 1.04 g/cc; sulfur content of 5.8 wt. %; nitrogen content of 0.62 wt. %; MCR content of 17.6 wt. %; and a pitch content (pitch is defined in this Example 4 to be those hydrocarbons having a boiling temperature greater than 524° C. or 975° F.) of 81.7 wt. %.

The tests were conducted in a simulated two-stage ebullated bed unit that consisted of two continuous stirred tank reactor (CSTR) units obtained from Autoclave Engineers and equipped with Robinson-Mahoney internals, connected together in series flow. Each reactor was loaded with 90 cc of catalyst.

The operating conditions included an operating pressure of about 2010 psi, an operating temperature of 421° C. (790° F.), a liquid hourly space velocity of about 0.4 cc of feed per cc of catalyst per hour, and a hydrogen-to-oil ratio of about 3600 SCF/bbl.

EXAMPLE 5

This Example 5 presents the relative micro carbon residue conversion results from the testing of the catalysts described in Example 4.

The following Table 3 presents the results from the testing of the catalysts of Example 2 using the testing procedure described in Example 4. The results are expressed as conversion gain compared to the comparative catalyst. (Catalyst C1). It should be noted that pitch conversion increases are also observed with the catalysts of this invention.

TABLE 3

| | Performance results | |
|---|---|---|
| | Incremental Conversion over reference catalyst, wt % | |
| Catalyst ID | Pitch | MCR |
| C-1 | 0 | 0 |
| C-2 | 0 | 1 |
| C-3 | 3 | 1.5 |
| C-4 | 4.5 | 3.5 |
| C-5 | 2 | 3.5 |

FIG. 1 presents a plot of the surface area of each of the indicated catalysts referenced above as a function of its relative gain in percentage MCR conversion. These data show that a significant improvement in MCR conversion is obtainable with the inventive catalyst compositions that have relatively low surface area, particularly, in comparison to certain prior art catalyst compositions, such as, for example, the high surface area compositions described in U.S. Pat. No. 8,372,268, such as catalyst C-1.

It is recognized from the data that a critical upper limit for the surface area of the inventive catalyst is less than about 240 $m^2/g$, and it is believed that a practical lower limit for the low surface area catalyst composition of the invention is greater than about 160 $m^2/g$.

As may further be observed from the performance data, there is a critical upper limit for the surface area at which point the catalyst composition begins to exhibit the property of providing incremental improvement in its MCR conversion characteristic as the surface area is lowered or reduced. This improvement in the MCR conversion characteristic appears to continue with further decreases in the total surface area of the catalyst composition until the improvement reaches a limit at which point there is a minimal improvement in the MCR conversion with even a significant incremental decrease in the total surface area.

It, thus, can be a desirable property of the inventive catalyst composition to have a relatively low total surface area that is controlled to within a specific and narrow range in order for the catalyst composition to provide the desired enhanced MCR conversion characteristic.

One desired range for the total surface area of the inventive catalyst composition can be from or about 190 $m^2/g$ to or about 238 $m^2/g$. It is preferred for the total surface area of the inventive catalyst composition to be in the range of from or about 195 $m^2/g$ to or about 235 $m^2/g$.

It is further observed from the above-presented data that in addition to having a relatively low total surface area within a specific and narrowly defined range, the pore structure and pore volume characteristics of the inventive catalyst should also be defined to be within certain specific ranges. It is believed that the proportion of the total pore volume of the catalyst composition contained in its pores within certain well-defined and specified pore diameter ranges can be critical to the catalyst composition exhibiting the enhanced MCR conversion capability noted herein.

One pore diameter range required to have a certain proportion of the total pore volume of the catalyst composition includes those pores having a diameter in the range of from 55 Å to 115 Å. The proportion of the total pore volume of the inventive catalyst composition present within the pores of diameter in the range of from 55 Å to 115 Å, thus, should be less than about 60 percent.

Figure 2:
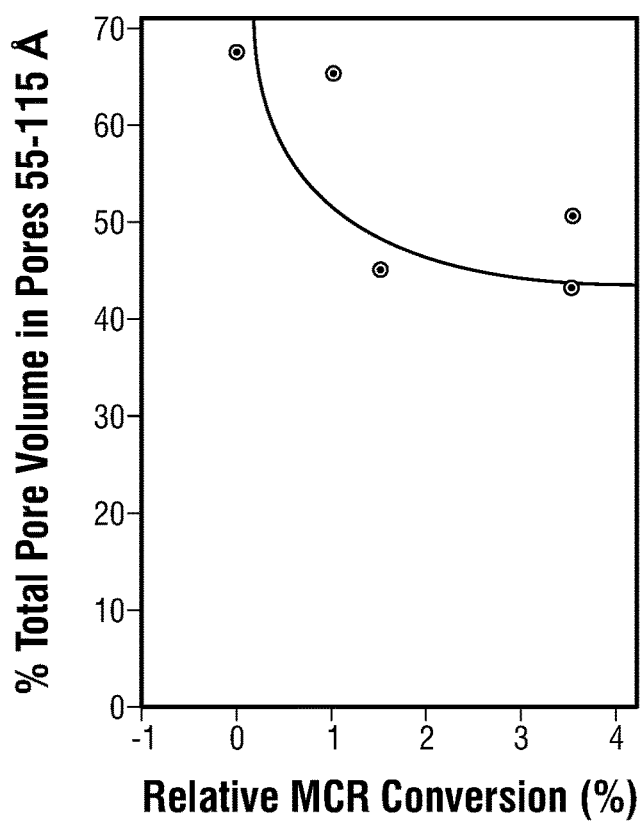
FIG. 2 is a plot of the percentage of total pore volume of each of the comparison and inventive catalyst compositions that is contained in its pores of diameter in the range of from 55 Å to 115 Å as a function of the relative gain in percentage MCR conversion provided by each composition.

FIG. 2 is a plot of the percentage of total pore volume that is contained in pores of diameter in the range of from 55 Å to 115 Å as a function of the relative gain in the percentage MCR conversion. These data show that significant incremental improvement in the MCR conversion characteristic of the inventive catalyst is provided by a reduction in the proportion of total pore volume contained the pores within this pore diameter range from a high proportion to a lower proportion. But, a limit in the incremental improvement is reached, which suggests that there is a critical range for the proportion of total pore volume that is contained in the pores of diameter in the range of from 55 Å to 115 Å.

Figure 3:
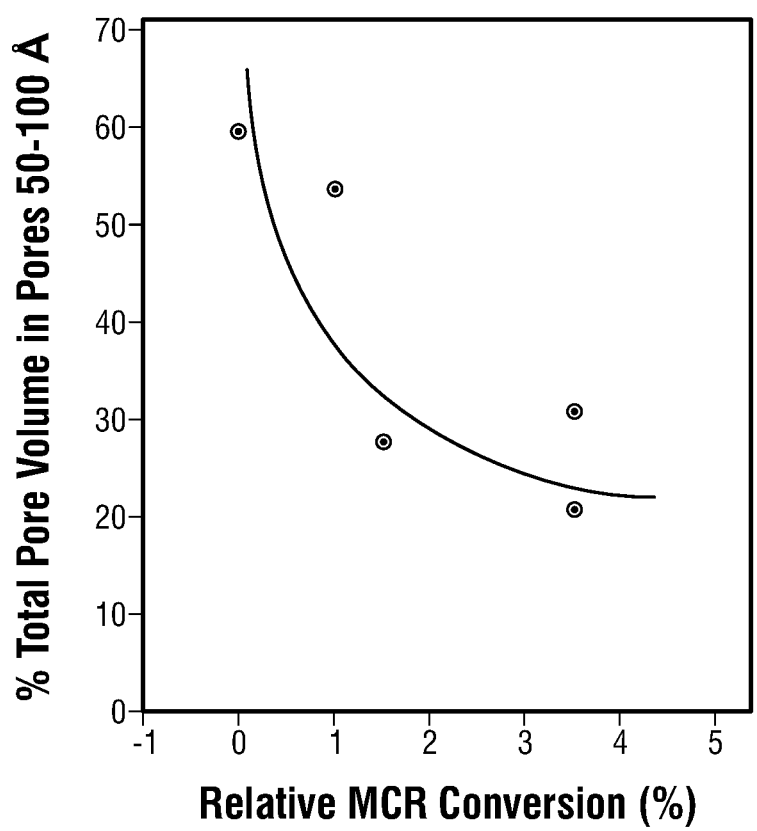
FIG. 3 is a plot of the percentage of total pore volume of the comparison and inventive catalyst compositions that is contained in its pores of diameter in the range of from 50 Å to 100 Å as a function of the relative gain in percentage MCR conversion provided by each composition.

FIG. 3 is a plot of the percentage of total pore volume that is contained in pores of diameter in the range of from 50 Å to 100 Å of the inventive catalyst as a function of relative gain in the percentage MCR conversion provided by the catalyst. These data show a pronounced improvement in the MCR conversion characteristic of the inventive catalyst that is provided by the pore structure being such that a certain percentage of the total pore volume that is contained within the pores within the specific pore diameter range of from 50 Å to 100 Å.

It is significant that there is a critical upper limit for the proportion of total pore volume of the inventive catalyst that is contained within its pores of a pore diameter within the range of from 50 Å to 100 Å in order to provide or impart the improved or enhanced MCR conversion property. This upper limit is less than about 49% of the total pore volume contained within the pores of a pore diameter in the range of from 50 Å to 100 Å.

A desirable range for the percentage of total pore volume contained within the pores of a pore diameter in the range of from 50 Å to 100 Å is from or about 45% to or about 10%, and, it is preferred for the percentage to be in the range of from 40% to 15%. It is more preferred for the percentage of total pore volume contained within the pores of pore diameter in the range of from 50 Å to 100 Å to be in the range of from 38% to 15%, but, most preferred, the range is from 35% to 20%.

That which is claimed is:

1. A process for converting at least a portion of an MCR content of a heavy hydrocarbon feedstock to yield a product having a reduced MCR content, wherein said process includes contacting said heavy hydrocarbon feedstock with a catalyst under MCR conversion process conditions and yielding said product, wherein the improvement comprises: enhancing the conversion of said MCR content of said heavy hydrocarbon feedstock by using as said catalyst in said process a calcined particulate of a co-mulled mixture, wherein said co-mulled mixture that is formed into a particulate, which is subsequently calcined to provide said calcined particulate, comprises a molybdenum component, a nickel component, an uncalcined pseudo-boehmite powder prepared by a two-step precipitation process and comprising at least 90 weight percent pseudo-boehmite, a mineral acid, and a catalyst fines portion having a particle size between 5 and 50 microns (μm) and a mean pore diameter between 40 Å and 150 Å, and wherein said calcined particulate is prepared under conditions so that it has specifically defined physical properties including:
(a) a total surface area of greater than 160 m$^2$/g and less than 240 m$^2$/g;
(b) a median pore diameter in the range of from 85 Å to 120 Å;
(c) from 8% to 22% of the total pore volume of said calcined particulate in the macropores having a pore diameter of 250 Å or greater; and
(d) greater than 40% and no more than 60% of the total pore volume of said calcined particulate within its pores having a diameter in the range of from 55 Å to 115 Å; and
(e) from about 10% to about 45% of the total pore volume of said calcined particulate is within the pores of a pore diameter in the range of from 50 Å to 100 Å.

2. The process as recited in claim 1, wherein from 15% to 40% of said surface area is provided by pores having a pore diameter of less than or equal to 75 Å, as determined by $N_2$ desorption.

3. The process as recited in claim 1, wherein from 20% to 60% of said surface area is provided by pores having a pore diameter in the range of 100 to 150 Å, as determined by mercury intrusion.

4. The process as recited in claim 1, wherein said calcined particulate has a nitrogen median pore diameter that is in the range of from 87.5 Å to 115 Å.

5. The process as recited in claim 1, further comprising a molybdenum component in an amount not less than 5 wt % but not more than 13 wt %, with the wt % being based on the total weight of said catalyst composition and assuming said molybdenum component is in the oxide form regardless of its actual form, and a nickel component present in an amount such that the weight ratio of the nickel component-to-molybdenum component is at least 0.25.

6. The process as recited in claim 1, wherein from 20% to 60% of the total pore volume of said calcined particulate is present as pores having diameters in the range of from 100 Å to 150 Å, and wherein the portion of total pore volume of said calcined particulate in pores having diameters in the range of from 50 Å to 100 Å is less than the portion of its total pore volume in the pores having a pore diameter in the range of from 100 Å to 150 Å.

7. The process as recited in claim 1, wherein the calcination of said particulate of said co-mulled mixture is conducted in air without added steam under calcination conditions that include a calcination temperature exceeding 1150° F. to provide said calcined particulate.

8. The process as recited in claim 1, wherein said catalyst fines portion comprises molybdenum oxide, nickel oxide, phosphorus oxide, and γ-alumina, and wherein said catalyst fines portion is in an amount so as to provide a phosphorus content in said calcined particulate within a desired range.

9. The process as recited in claim 1, wherein said calcined particulate has a total surface area in the range of from 190 m$^2$/g to 235 m$^2$/g.

10. The process as recited in claim 1, wherein said calcined particulate has a total surface area in the range of from 195 m$^2$/g to 230 m$^2$/g.

11. The process as recited in claim 1, wherein from 10% to 45% of the total pore volume of said calcined particulate is present as pores having diameters in the range of from 50 Å to 100 Å, and wherein from 25% to 55% of the total pore volume of said calcined particulate is present as pores having diameters in the range of from 100 Å to 150 Å.

12. The process as recited in claim 1, wherein from 15% to 38% of the total pore volume of said calcined particulate is present as pores having diameters in the range of from 50 Å to 100 Å, and wherein no more than 55% of the total pore volume of said calcined particulate is present as pores having diameters in the range of from 55 Å to 115 Å.

13. The process as recited in claim 1, wherein from 20% to 35% of the total pore volume of said calcined particulate is present as pores having diameters in the range of from 50 Å to 100 Å, and wherein no more than 55% of the total pore volume of said calcined particulate is present as pores having diameters in the range of from 55 Å to 115 Å.

14. The process as recited in claim 1, wherein said mineral acid is an aqueous solution of nitric acid having a molar concentration and added to said co-mulled mixture in an amount so as to provide a desired microporosity of said calcined particulate.

15. The process as recited in claim 1, wherein an amount of said catalyst fines portion in the co-mulled mixture is up to 50 wt % based on the total weight of said catalyst composition.

* * * * *